US008754934B2

(12) United States Patent
Shi et al.

(10) Patent No.: US 8,754,934 B2
(45) Date of Patent: Jun. 17, 2014

(54) DUAL-CAMERA FACE RECOGNITION DEVICE AND METHOD

(75) Inventors: Jian Shi, Beijing (CN); Lei Huang, Beijing (CN)

(73) Assignee: Hanwang Technology Co., Ltd., Beijing (CN)

( * ) Notice: Subject to any disclaimer, the term of this patent is extended or adjusted under 35 U.S.C. 154(b) by 491 days.

(21) Appl. No.: 13/056,612

(22) PCT Filed: Jul. 27, 2009

(86) PCT No.: PCT/CN2009/072928
§ 371 (c)(1),
(2), (4) Date: Jan. 28, 2011

(87) PCT Pub. No.: WO2010/012215
PCT Pub. Date: Feb. 4, 2010

(65) Prior Publication Data
US 2011/0128362 A1    Jun. 2, 2011

(30) Foreign Application Priority Data

Jul. 28, 2008    (CN) .......................... 2008 1 0117257

(51) Int. Cl.
  *G03B 13/00*    (2006.01)
  *H04N 5/232*    (2006.01)
(52) U.S. Cl.
  USPC .......................................................... 348/77
(58) Field of Classification Search
  USPC ......................................... 348/77; 382/15, 18
  See application file for complete search history.

(56) References Cited

U.S. PATENT DOCUMENTS

| 6,882,741 | B2 * | 4/2005 | Dobashi et al. | 382/118 |
| 8,224,040 | B2 * | 7/2012 | Li | 348/77 |
| 2004/0042644 | A1 * | 3/2004 | Yuasa et al. | 382/118 |
| 2006/0262187 | A1 * | 11/2006 | Takizawa | 348/77 |

FOREIGN PATENT DOCUMENTS

| CN | 1595280 | 3/2005 |
| CN | 1618079 | 5/2005 |
| CN | 1658224 | 8/2005 |
| CN | 2828935 | 10/2006 |
| CN | 1315092 | 5/2007 |
| CN | 201233607 | 5/2009 |
| CN | 201242756 | 5/2009 |

OTHER PUBLICATIONS

English Abstract of CN 201242756, published May 20, 2009.
English Abstract of CN 201233607, published May 6, 2009.

(Continued)

*Primary Examiner* — Dave Czekaj
*Assistant Examiner* — Berteau Joisil
(74) *Attorney, Agent, or Firm* — Michael J. Donahue; Davis Wright Tremaine LLP

(57) ABSTRACT

A dual-camera face recognition device and method are disclosed. The device includes: a first camera, for capturing a face image; a second camera, arranged at a different position from the first camera, for capturing a face image; a face recognition processing unit, for receiving and recognizing the face image captured by the first camera and obtaining a first candidate set, and for receiving and recognizing the face image captured by the second camera and obtaining a second candidate set. The face recognition processing unit is also adapted to select from the first candidate set and the second candidate set a candidate object whose similarity complies with a predetermined rule as a recognition result.

14 Claims, 5 Drawing Sheets

(56) References Cited

OTHER PUBLICATIONS

English Abstract of CN 2828935, published Oct. 18 2006.
English Abstract of CN 1658224, published Aug. 24, 2005.
English Abstract of CN 1618079, published May 18, 2005.
English Abstract of CN 1595280, published Mar. 16, 2005.
English Abstract of CN 1315092, published May 9, 2007.

* cited by examiner

DUAL-CAMERA FACE RECOGNITION DEVICE AND METHOD

FIELD OF THE INVENTION

The present invention relates to a biometric recognition field, and especially, to a face recognition device and method, particularly relates to a dual cameral face recognition device and method.

BACKGROUND OF THE INVENTION

Biometric recognition technology is known as one of the top ten technologies that bring revolutionary changes in human society. As the most convenient and secure identification recognition technology, the biometric recognition technology recognizes the human beings per se without any mark outside of the human beings. The biometric recognition technology performs identification by using physical characteristics and behavior of human, mainly including fingerprint recognition, face recognition, iris recognition, gait recognition and the like. Among other things, the face recognition is currently popular in the biometric recognition field. As compared with fingerprint recognition technology applied widely, it has many significant advantages, for example, it is intuitive, convenient, non-contact, friendliness and of high user acceptance and so on.

The existing face recognition technology can be divided into two-dimensional face recognition and three-dimensional face recognition. Three-dimensional face recognition is based on three-dimensional face images, however, there are several disadvantages such as the complexity of a capturing system and face reconstruction algorithms. For example, as seen mentioned in Application No. "CN 1595280A" and titled as "THREE-DIMENSIONAL HUMAN FACE REBUILDING SYSTEM ON ROTATING PLATFORM", No. "CN 1315092C" and titled as "THREE DIMENSION FACE RECOGNITION METHOD BASED ON POLAR SPECTRUM IMAGE", the existing three-dimensional face recognition is expensive and restrictive.

Two-dimensional face recognition is based on a single planar face image. In general, a two-dimensional face recognition method includes steps of capturing a planar face image by means of one camera, performing face detection, eye location and feature extraction, then comparing with a template library and making recognition decision. However, the recognition performance is poor since a recognition rate for a single face plane image captured by one camera is actually affected by ambient lights, capturing angels, postures, face expressions and the other factors.

SUMMARY OF THE INVENTION

In order to solve the above problem, a dual-camera face recognition device and method is provided in one or more embodiments of the present invention, which may significantly improve the recognition performance for the existing two-dimensional face recognition.

According to an aspect of the present invention, a dual-camera face recognition device, comprising: a first camera, for capturing a first face image; a second camera, arranged at a position different from the first camera, for capturing a second face image; a face recognition processing unit, for receiving and recognizing the first face image captured by the first camera and obtaining a first candidate set, and for receiving and recognizing the second face image captured by the second camera and obtaining a second candidate set, and for selecting from the first candidate set and the second candidate set a candidate object, whose similarity complies with a predetermined rule, as a recognition result.

Additionally, the dual-camera face recognition device further comprises an infrared fixed active light source, arranged behind the first camera and the second camera, for serving as a light source for capturing face images. As an example of the present invention, the dual-camera face recognition device further comprises an infrared transmission filter, arranged in front of the first camera, for filtering out visible lights such that a black and white face image is captured by the first camera; and an infrared cut filter, arranged in front of the to second camera, for filtering out infrared lights such that a color face image is captured by the second camera. Preferably, the dual-camera face recognition device further comprises a display unit, for receiving and displaying the color face image captured by the second camera. As an example of the present invention, the dual-camera face recognition device further comprises infrared transmission is filters, arranged in front of the first camera and the second camera respectively, for filtering out visible lights such that the first camera and the second camera respectively captures a black and white face image.

According to a first embodiment of the present invention, the face recognition processing unit is configured to compute a sum of a similarity of a candidate object in the first candidate set with respect to the first face image captured by the first camera and a similarity of the same candidate object in the second candidate with respect to the second face image capture by the second camera if any, for each of the candidate objects in the first candidate set, so as to obtain sums of similarities, determine whether a maximum value of the sums of similarities is greater than a predetermined threshold, and select a candidate object corresponding to the maximum value as a recognition result when the maximum value is greater than the predetermined threshold.

According to a second embodiment of the present invention, the face recognition processing unit is configured to determine whether a maximum value among similarities of all candidate objects in the first candidate set and the second candidate set is greater than a predetermined threshold, and selects a candidate object corresponding to the maximum value as a recognition result when the maximum value is greater than the predetermined threshold.

According to a third embodiment of the present invention, the face recognition processing unit is configured to select from the first candidate set a candidate object whose similarity is greater than a first predetermined threshold, and select from the second candidate set a candidate object whose similarity is greater than a second predetermined threshold, so as to form a third candidate set, compute a sum of a similarity of a candidate object in the third candidate set with respect to the face image captured by the first camera and a similarity of the same candidate object in the third candidate set with respect to the face image captured by the second camera if any, for all of the candidate objects in the third candidate set, so as to obtain sums of similarities, determine whether a maximum value of the sums of similarities is greater than a third predetermined threshold, and select a candidate object corresponding to the maximum value as a recognition result when the maximum value is greater than the third predetermined threshold.

According to another aspect of the present invention, a dual-camera face recognition method is provided, which comprises steps of capturing a first face image by a first camera; capturing a second face image by a second camera arranged at a position different from the first camera; recognizing the first face image captured by the first camera and obtaining a first candidate set, and recognizing the second face image captured by the second camera and obtaining a second candidate set; and selecting from the first candidate set and the second candidate set a candidate object, whose similarity complies with a predetermined rule, as a recognition result.

In addition, the dual-camera face recognition method further comprises step of providing each of the first camera and the second camera with an infrared fixed active light source as a light source for capturing face images. As an example of the present invention, the step of capturing a first face image by the first camera further comprises steps of: filtering out visible lights by an infrared to transmission filter arranged in front of the first camera and capturing a black and white image by the first camera; and the step of capturing a second face image by the second camera arranged at a position different from the first camera further comprises steps of: filtering out infrared lights by an infrared cut filter arranged in front of the second camera and capturing a color face image by the second camera. Preferably, the dual-camera face recognition method further comprises a step of displaying on a display unit the color face image captured by the second camera. As another example of the present invention, the steps of capturing the first face image by the first camera and capturing the second face image by the second camera arranged at a position different from the first camera further comprise steps of: filtering out visible lights by infrared transmission filters, which are arranged in front of the first camera and the second camera, respectively, and capturing black and white face images by the first camera and the second camera.

According to a first embodiment of the present invention, the step of selecting from the first candidate set and the second candidate set a candidate object, whose similarity complies with a predetermined rule, as a recognition result further comprises steps of: computing a sum of a similarity of candidate object in the first candidate set with respect to the first face image captured by the first camera and a similarity of the same candidate object in the second candidate with respect to the second face image capture by the second camera if any, for each of the candidate objects in the first candidate set, so as to obtain sums of similarities; determining whether a maximum value among the sums of similarities is greater than a predetermined threshold; and selecting a candidate object corresponding to the maximum value as a recognition result when the maximum value is greater than the predetermined threshold.

According to a second embodiment of the present invention, the step of selecting from the first candidate set and the second candidate set a candidate object, whose similarity complies with a predetermined rule, as a recognition result further comprises steps of: determining whether a maximum value among similarities of all candidate objects in the first candidate set and the second candidate set is greater than a predetermined threshold; and selecting a candidate object corresponding to the maximum value as a recognition result when the maximum value is greater than the predetermined threshold.

According to a third embodiment of the present invention, the step of selecting from the first candidate set and the second candidate set a candidate object, whose similarity complies with a predetermined rule, as a recognition result further comprises steps of: selecting from the first candidate set a first candidate object whose similarity is greater than a first predetermined threshold and selecting from the second candidate set a second candidate object whose similarity is greater than a second predetermined threshold, so as to form a third candidate set; computing a sum of a similarity of a candidate object in the third candidate set with the first face image captured by the first camera and a similarity of the same candidate object in the third candidate set with respect to the second face image capture by the second camera if any, for each of the candidate objects in the third candidate set so as to obtain sums of similarities; determining whether a maximum value of the sums of similarities is greater than a third predetermined threshold; and selecting a candidate object corresponding to the maximum value as a recognition result when the maximum value is greater than the third predetermined threshold.

On the basis of the existing face capturing usually employing a single camera, the face recognition device and method according to the present to invention employs dual cameras to perform face capturing and face recognition and then performs a selection on two candidate sets based on a predetermined rule. The present invention is easily implemented and may significantly improve recognition performance of the existing two-dimensional face recognition. In addition, the face recognition device according to the present invention may display a color image on a display unit, which may bring good user experience.

BRIEF DESCRIPTION OF THE DRAWINGS

For a more complete understanding of the present invention and its advantages, detailed embodiments of the present invention will be described with reference to the drawings. Please be noted that similar reference signs represent similar components throughout the drawings, in which.

DETAILED DESCRIPTION OF THE PREFERRED EMBODIMENTS

Figure 1:
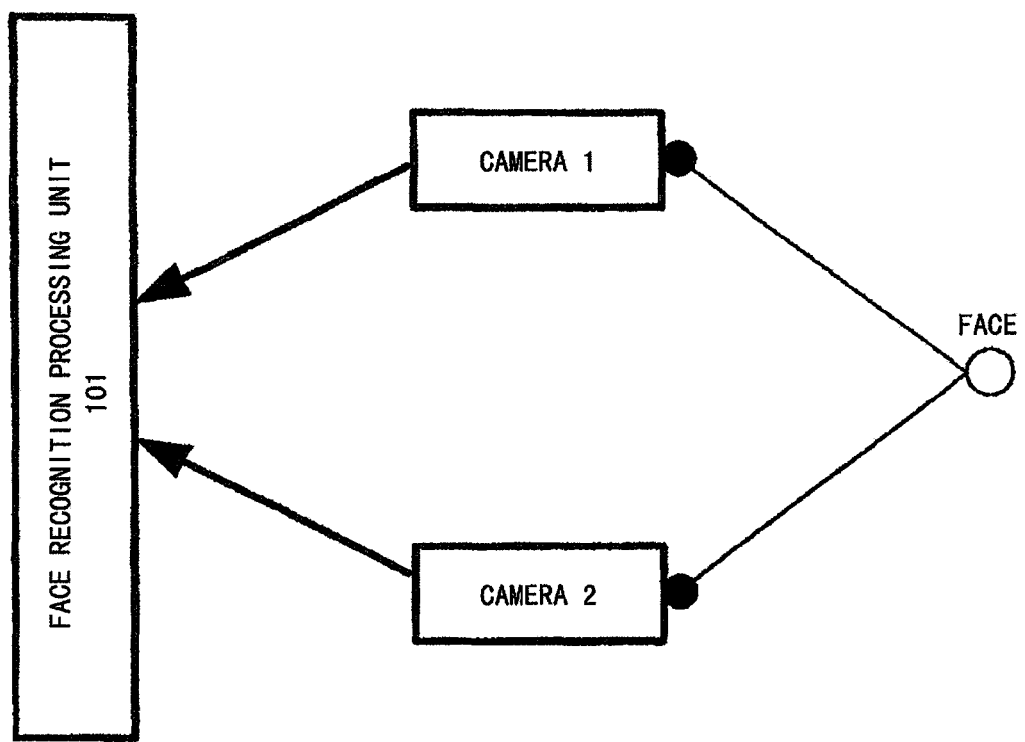
FIG. 1 is a schematic diagram of a dual-camera face recognition device according to an embodiment of the present invention.

FIG. 1 is a schematic diagram of a dual-camera face recognition device according to an embodiment of the present invention. A first camera 1 and a second camera 2 are respectively placed at different positions, which are suitable for capturing face images, so as to capture face images. For example, the first camera 1 and the second camera 2 may be placed at a certain distance in the horizontal direction or in the vertical direction. Alternatively, the cameras may be placed at other positions, which may facilitate capturing face images, depending on placement conditions, appearances, invisibility and the other factors. Preferably, they may be placed in the same height with a certain interval, such as 10 cm. The first camera 1 and the second camera 2 may be electrically connected to a face recognition processing unit 101 respectively, for signal transmission to the face recognition processing unit 101. The face recognition processing unit 101 may employ a PC platform or an embedded platform, such as DSP, ARM and the like. When a person stands within a certain range in front of the first camera 1 and the second camera 2, the first camera 1 and the second camera 2 will respectively capture face images and transmit them to the face recognition processing unit 101. The face recognition processing unit 101 then performs face recognition processing using image information captured by the two cameras, so as to enhance light, gesture and face expression adaptability of the common two-dimensional face recognition system.

Figure 2:
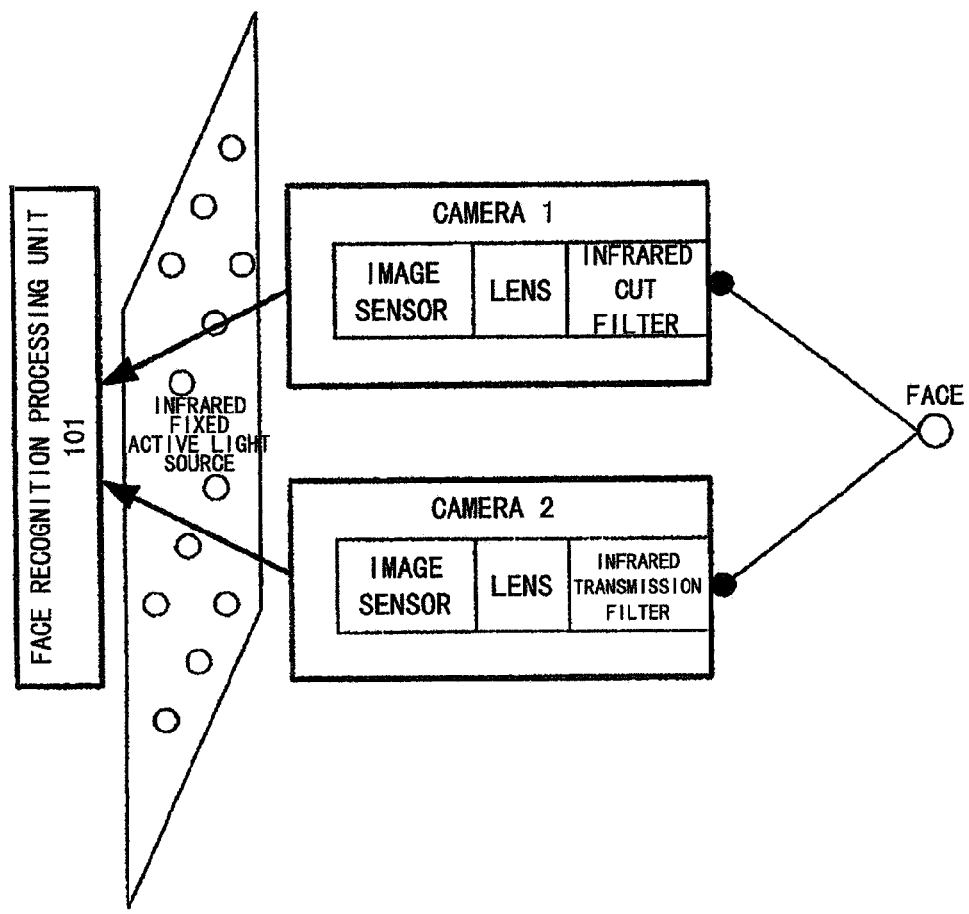
FIG. 2 is a schematic diagram of a dual-camera face recognition device, which employs an infrared fixed active light source, according to an embodiment of the present invention.

In order to enhance light adaptability of the face recognition device according to the present invention, the face recognition device according to the present invention may be provided with an active light source. FIG. 2 is a schematic diagram of a dual-camera face recognition device according to an embodiment of the present invention. In this embodiment, an infrared fixed active light source serves as a light source for capturing a face image, so as to enhance light adaptability of the common two-dimensional face recognition device. In the to dual-camera face recognition device according to the embodiment, the infrared fixed active light source is composed of a plurality of infrared light-emitting diodes that are uniformly distributed, and is of a central wavelength of 700-2000 nm, preferably as 850 nm. This light source may be arranged behind the first camera 1 and the second camera 2. It should be appreciated that light sources of the same is functions may be employed, other than that illustrated in this embodiment.

It should be appreciated that the two cameras may capture the same type of face images. For example, infrared transmission filters may be arranged in front of each camera respectively for filtering out visible lights so as to capture a black and white face image, or infrared cut filters may be arranged in front of each camera for filtering out infrared lights so as to capture a color face image. Furthermore, in order to improve the recognition efficiency, the two cameras may be allowed to capture different type of face images. For example, one camera captures a black and white image, and the other captures a color image. To prevent lens of a camera from being affected by the ambient light, preferably, an infrared transmission filter may be installed in front of lens of one camera, which is capable of filtering out visible lights while with infrared lights penetrating, or a light filter may be directly coated onto the lens, so as to directly capture a black and white image. Moreover, in order to prevent lens of a camera from being affected by the infrared lights, preferably, an infrared cut filter may be installed in front of lens of the other camera, which is capable of filtering out infrared lights while with visible lights penetrating. Or a light filter may be directly coated onto the lens, so as to capture a color image. CMOS or CCD may be used as an image sensor of the cameras. Of course, the present invention is not limited to the above embodiment, and those skilled in the art may perform various settings and modifications on natures of images captured by the cameras depending on various applications, alternatively, additional devices may be added for capturing images of specific natures, which all fall into the scope of the present invention.

In addition, in order to bring good user experience while capturing a black and white image, the face recognition device according to the present is invention may further comprise a display unit (not shown). When either of the first camera and the second camera captures a color face image, the display unit may receive and display the color face image captured by the camera.

Figure 3:
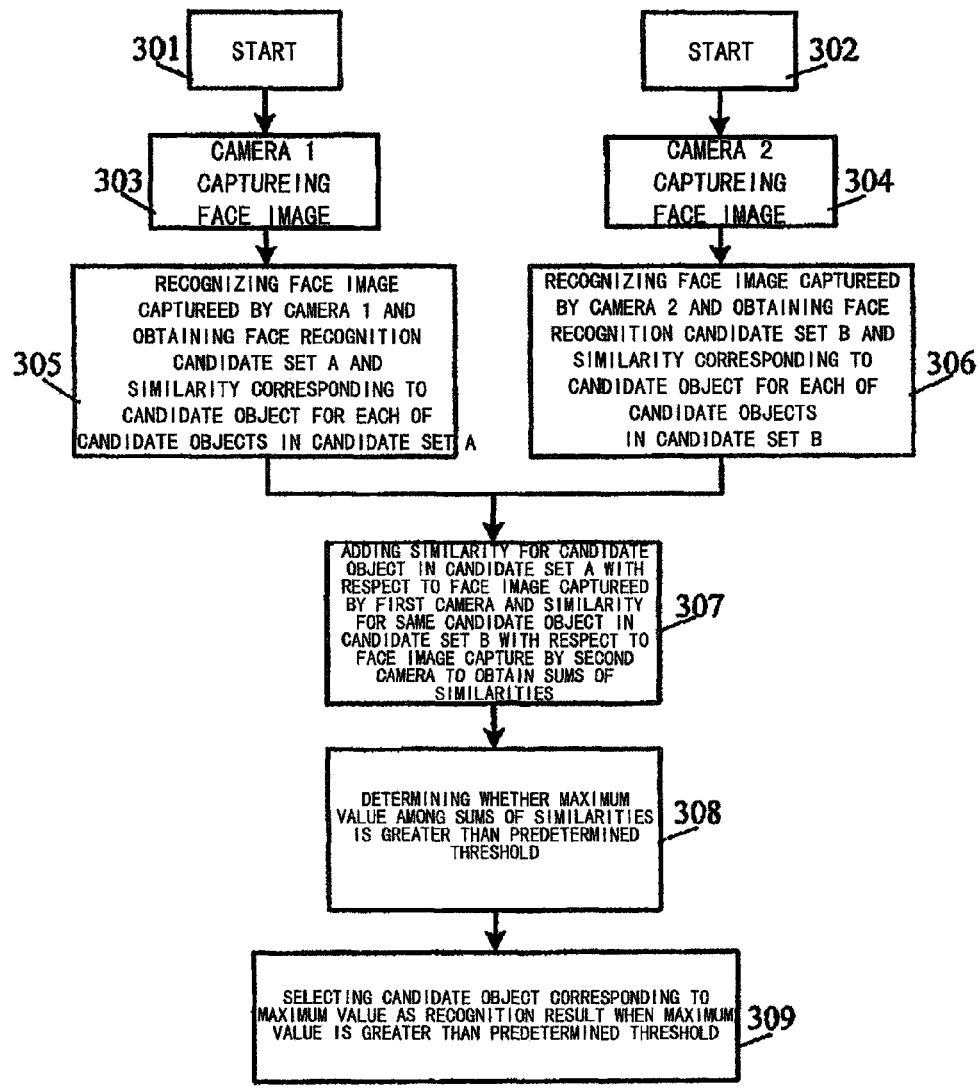
FIG. 3 is a flowchart of a dual-camera face recognition method according to a first embodiment of the present invention.

FIG. 3 is a flowchart of a dual-camera face recognition method according to a first embodiment of the present invention. At steps 301 and 302, a first camera and a second camera respectively start to perform face recognition. At steps 303 and 304, the first camera and the second camera respectively capture a face image. A face recognition processing unit recognizes the face image captured by the first camera (step 305) and the face image captured by the second camera (step 306) so as to obtain two face recognition candidate sets A and B respectively and respective similarity corresponding to each candidate object in the candidate sets A and B. Suppose numbers of candidate objects in the sets A and B are m and n, respectively. At step 307, when there are the same candidate object in the candidate set B, for each of the candidate objects in the candidate set A, a sum of a similarity of candidate object in the candidate set A with respect to the face image captured by the first camera and a similarity of the same candidate object in the candidate set B with respect to the face image capture by the second camera are computed, so as to obtain sums of similarities, and then the sums of similarities are sorted in a descending order so as to obtain a combined similarity ranking for the candidate objects. At step 308, whether the maximum value of the sums of the similarities (i.e., a sum of similarity with highest to level in the similarity combined ranking) is greater than a predetermined threshold is determined. When the maximum value is greater than the predetermined threshold, a candidate object corresponding to the maximum value is selected as a recognition result, as shown at step 309.

At steps 305 and 306, the face recognition processing unit may perform face recognition based on various recognition algorithms. In addition, the predetermined threshold is a value obtained by repeated tests based on values of similarity, recognition rates and the other factors.

Figure 4:
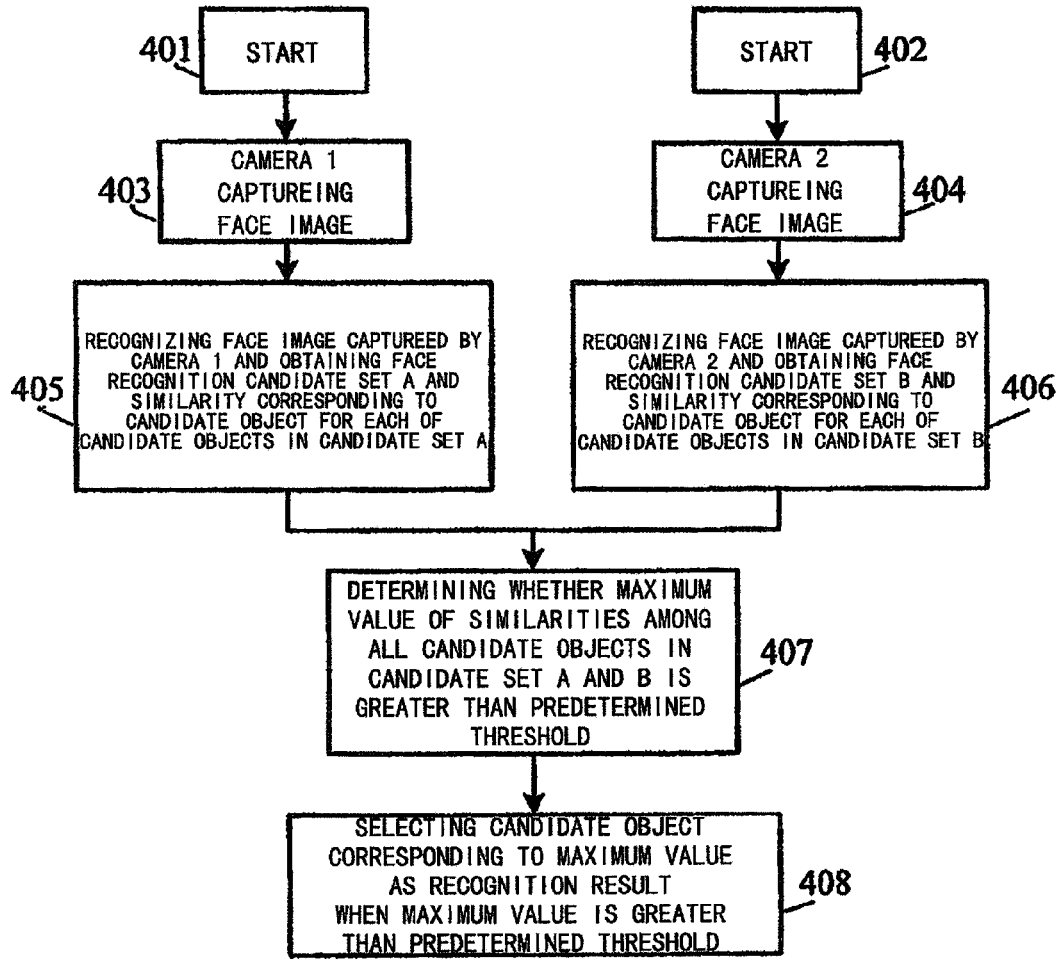
FIG. 4 is a flowchart of a dual-camera face recognition method according to a second embodiment of the present invention.

FIG. 4 is a flowchart of a dual-camera face recognition method according to a second embodiment of the present invention. At steps 401 and 402, a first camera and a second camera respectively start to perform face recognition. At steps 403 and 404, the first camera and the second camera respectively capture a face image. A face recognition processing unit recognizes the face image captured by the first camera (step 405) and the face image captured by the second camera (step 406) so as to obtain two face recognition candidate sets A and B and similarities corresponding to each of candidate objects in the candidate sets A and B. Suppose numbers of candidate objects in the sets A and B are m and n, respectively. At step 407, it is determined whether a maximum value of the similarities for all the m+n candidate objects in the candidate sets A and B is greater than a predetermined threshold. When the maximum value is greater than the predetermined threshold, a candidate object corresponding to the maximum value is selected as a recognition result, as shown at step 408.

Figure 5:
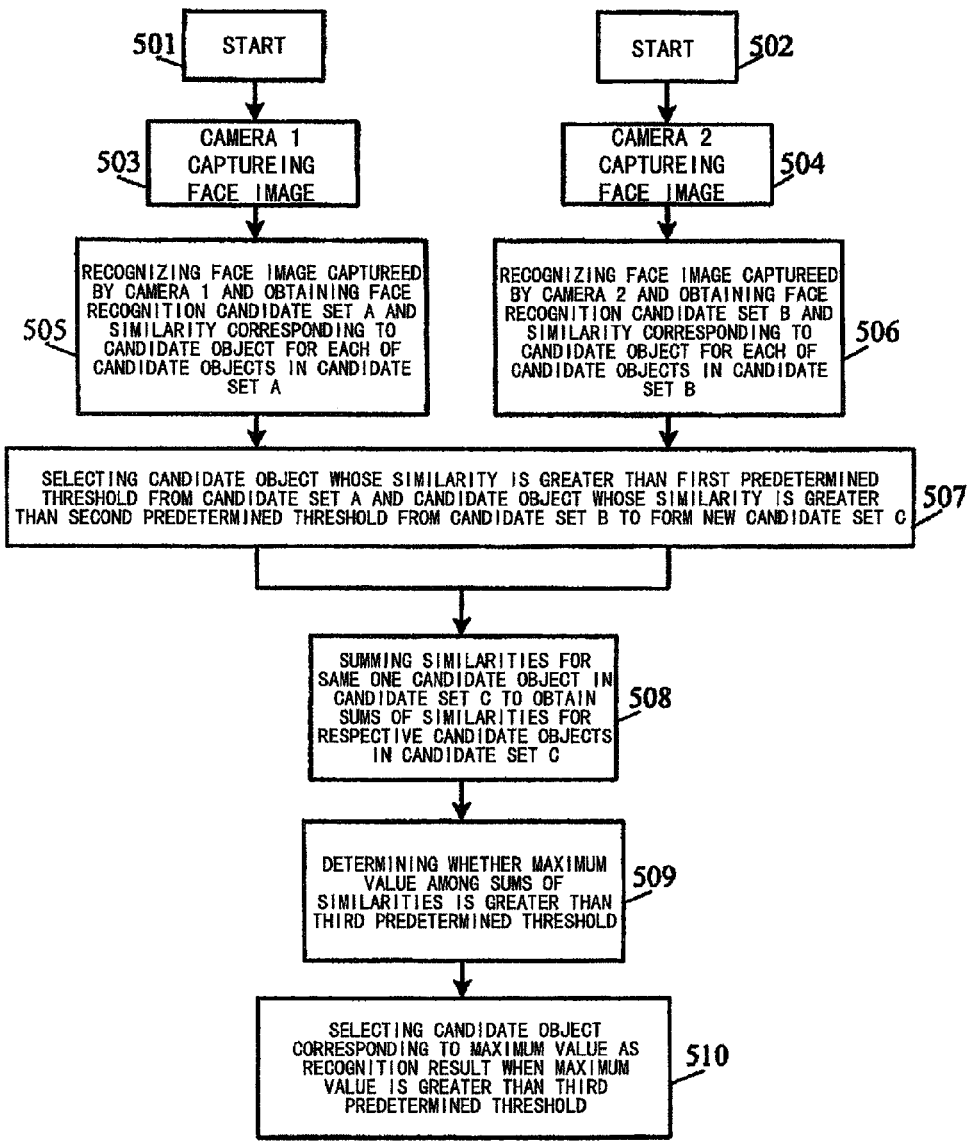
FIG. 5 is a flowchart of a dual-camera face recognition method according to a third embodiment of the present invention.

FIG. 5 is a flowchart of a dual-camera face recognition method according to a third embodiment of the present invention. According to the dual-camera face recognition method according to this embodiment, a face recognition processing unit 101 firstly selects candidate objects of greater to similarities with respect to a face image captured by a first camera in the candidate set A and candidate objects of greater similarities with respect to a face image captured by a second camera in the candidate set B so as to remain these candidate objects in the sets, and then selects a candidate object as a recognition result from the remained candidate objects based on a predetermined rule. At is steps 501 and 502, a first camera and a second camera respectively start to perform face recognition. At steps 503 and 504, the first camera and the second camera respectively capture a face image. A face recognition processing unit recognizes the face image captured by the first camera (step 505) and the face image captured by the second camera (step 506) so as to obtain two face recognition candidate sets A and B and similarities corresponding to each of the candidate objects in the candidate sets A and B.

Suppose numbers of candidate objects in the sets A and B are m and n, respectively. At step 507, a candidate object whose similarity is greater than a first predetermined threshold is selected from the candidate set A and a candidate object whose similarity is greater than a second predetermined threshold is selected from the candidate set B, so as to form a new candidate set C. Suppose the number of the candidate objects selected from the set A is m1 and m1≤n, and the number of the candidate objects selected from the set B is n1 and n1≤n. At step 508, for each of the candidate objects in set C, a sum of a similarity of the candidate object of the m1 candidate objects with respect to the face image captured by the first camera and a similarity of the same candidate object of the n1 candidate objects with respect to the face image capture by the second camera is computed, so as to obtain sums of similarities, and then the sums of similarities are sorted in a descending order so as to obtain similarity combined ranking for the candidate objects. At step 509, a maximum value in the to similarity combined ranking, i.e. whether the maximum value of the sums of the similarities is greater than a third predetermined threshold is determined. When the maximum value is greater than the third predetermined threshold, a candidate object corresponding to the maximum value is selected as a recognition result. At steps 507 and 509, the first, second and third predetermined thresholds are values obtained by repeated tests based on values of similarity, recognition rates and the other factors. The first predetermined threshold may be equal to the second predetermined threshold, which depends on different properties of images captured by the cameras. Of course, they may be different values.

On the basis of the existing face capturing usually employing a single camera, the present invention proposes a dual-camera face recognition device, which can significantly improve recognition performance of the existing two-dimensional face recognition. Additionally, in order to significantly prevent the recognition operation from ambient lights, the existing face recognition system generally captures black and white face images for display and recognition, which however brings poor user experience. Therefore, the present invention is also benefit in bringing good user experience while capturing black and white face images.

The foregoing description gives only the preferred embodiments of the present invention. It is obvious that any modification, substitution, improvement or like falls into the spirit and principle of the present invention defined by Claims attached.

What is claimed is:

1. A dual-camera face recognition device, comprising:
a first camera for capturing a first face image;
a second camera, arranged at a position different from the first camera, for capturing a second face image; and
a face recognition processing unit for receiving and recognizing the first face image captured by the first camera to obtain a first candidate set, and for receiving and recognizing the second face image captured by the second camera to obtain a second candidate set, and for selecting from the first candidate set and the second candidate set a candidate object, whose similarity complies with a predetermined rule, as a recognition result, wherein the face recognition processing unit is adapted to:
form a third candidate set by selecting from the first candidate set a first candidate object whose similarity is greater than a first predetermined threshold, and selecting from the second candidate set a second candidate object whose similarity is greater than a second predetermined threshold;
obtain sums of similarities by computing, for each of the candidate objects in the third candidate set, a sum of (a) a similarity of the candidate object in the third candidate set with respect to the first face image captured by the first camera, and (b) a similarity of the same candidate object in the third candidate set with respect to the second face image captured by the second camera;
determine whether a maximum value among the sums of similarities is greater than a third predetermined threshold; and
select, as the recognition result, the candidate object corresponding to the maximum value among the sums of similarities when the maximum value is greater than the third predetermined threshold.

2. The dual-camera face recognition device according to claim 1, further comprising:
an infrared transmission filter, arranged in front of the first camera, for filtering out visible lights such that a black and white face image is captured by the first camera;
an infrared cut filter, arranged in front of the second camera, for filtering out infrared lights such that a color face image is captured by the second camera.

3. The dual-camera face recognition device according to claim 2, further comprising:
a display unit, for receiving and displaying the color face image captured by the second camera.

4. The dual-camera face recognition device according to claim 1, further comprising:
infrared transmission filters, arranged in front of the first camera and the second camera respectively, for filtering out visible lights such that the first camera and the second camera respectively captures a black and white face image.

5. The dual-camera face recognition device according to claim 1, wherein the face recognition processing unit is adapted to:
obtain second sums of similarities by computing, for each candidate object in the first candidate set, a sum of (a) a similarity of a candidate object in the first candidate set with respect to the first face image captured by the first camera, and (b) a similarity of the same candidate object in the second candidate set with respect to the second face image capture by the second camera, if any;
determine whether a second maximum value among the second sums of similarities is greater than a fourth predetermined threshold; and
select, as the recognition result, the candidate object corresponding to the second maximum value when the second maximum value is greater than the fourth predetermined threshold.

6. The dual-camera face recognition device according to claim 1, wherein the face recognition processing unit is adapted to:
determine whether a maximum similarity value is greater than a fourth predetermined threshold, the maximum similarity value being a maximum value among similarities of all candidate objects in the first candidate set and the second candidate set; and
select, as the recognition result, the candidate object corresponding to the maximum similarity value when the maximum similarity value is greater than the fourth predetermined threshold.

7. The dual-camera face recognition device according claim 1, further comprising:
an infrared fixed active light source, arranged behind the first camera and the second camera, for serving as a light source for capturing face images.

8. A dual-camera face recognition method, comprising steps of:
capturing a first face image by a first camera;
capturing a second face image by a second camera arranged at a position different from the first camera;
recognizing the first face image captured by the first camera to obtain a first candidate set, and recognizing the second face image captured by the second camera to obtain a second candidate set; and
selecting, from the first candidate set and the second candidate set, a candidate object, whose similarity complies with a predetermined rule, as a recognition result, the selecting of the recognition result comprising:
selecting from the first candidate set a first candidate object whose similarity is greater than a first predetermined threshold, and selecting from the second candidate set a second candidate object whose similarity is greater than a second redetermined threshold so as to form a third candidate set;
obtaining sums of similarities by computing, for each of the candidate objects in the third candidate set, a sum of (a) a similarity of the candidate object in the third candidate set with respect to the first face image captured by the first camera, and (b) a similarity of the same candidate object in the third candidate set with respect to the second face image captured by the second camera;
determining whether a maximum value among the sums of similarities is greater than a third predetermined threshold; and
selecting, as the recognition result, the candidate object corresponding to the maximum value among the sums of similarities when the maximum value is greater than the third predetermined threshold.

9. The dual-camera face recognition method according to claim 8, wherein the step of capturing the first face image by the first camera comprises filtering out visible lights by an infrared transmission filter arranged in front of the first camera so as to capture a black and white image by the first camera; and
wherein the step of capturing the second face image by the second camera comprises filtering out infrared lights by an infrared cut filter arranged in front of the second camera, and capturing a color face image by the second camera.

10. The dual-camera face recognition method according to claim 9, further comprising a step of:
displaying on a display unit the color face image captured by the second camera.

11. The dual-camera face recognition method according to claim 8, wherein, the steps of capturing the first face image by the first camera and capturing the second face image by the second camera further comprise steps of:
filtering out visible lights by an infrared transmission filter, which are arranged in front of the first camera and the second camera, respectively; and
capturing black and white face images by the first camera and the second camera.

12. The dual-camera face recognition method according to claim 8, wherein, the step of selecting from the first candidate set and the second candidate set the candidate object, whose similarity complies with the predetermined rule, as the recognition result further comprises steps of:
obtaining second sums of similarities by computing, for each candidate object in the first candidate set, a sum of (a) a similarity of the candidate object in the first candidate set with respect to the first face image captured by the first camera, and (b) a similarity of the same candidate object in the second candidate set with respect to the second face image capture by the second camera, if any;
determining whether a second maximum value among the second sums of similarities is greater than a fourth predetermined threshold; and
selecting, as the recognition result, the candidate object corresponding to the second maximum value among the second sums of similarities when the second maximum value is greater than the fourth predetermined threshold.

13. The dual-camera face recognition method according to claim 8, wherein, the step of selecting from the first candidate set and the second candidate set the candidate object, whose similarity complies with the predetermined rule, as the recognition result further comprises steps of:
determining whether a maximum similarity value is greater than a fourth predetermined threshold, the maximum similarity value being a maximum value among similarities of all candidate objects in the first candidate set and the second candidate set; and
selecting, as the recognition result, the candidate object corresponding to the maximum similarity value when the maximum similarity value is greater than the fourth predetermined threshold.

14. The dual-camera face recognition claim 8, further comprising:
providing each of the first camera and the second camera with an infrared fixed active light source as a light source for capturing face images.

* * * * *